US012594765B2

(12) United States Patent
Kanki

(10) Patent No.: US 12,594,765 B2
(45) Date of Patent: Apr. 7, 2026

(54) PRINTER

(71) Applicant: SCREEN HOLDINGS CO., LTD., Kyoto (JP)

(72) Inventor: Koji Kanki, Kyoto (JP)

(73) Assignee: SCREEN Holdings Co., Ltd., Kyoto (JP)

(*) Notice: Subject to any disclaimer, the term of this patent is extended or adjusted under 35 U.S.C. 154(b) by 125 days.

(21) Appl. No.: 18/456,907

(22) Filed: Aug. 28, 2023

(65) Prior Publication Data

US 2024/0100838 A1 Mar. 28, 2024

(30) Foreign Application Priority Data

Sep. 22, 2022 (JP) ................................ 2022-151017

(51) Int. Cl.
*B41J 2/165* (2006.01)
*B41J 2/17* (2006.01)
*B41J 29/17* (2006.01)

(52) U.S. Cl.
CPC ......... *B41J 2/16552* (2013.01); *B41J 2/1721* (2013.01); *B41J 29/17* (2013.01); *B41J 2/16508* (2013.01)

(58) Field of Classification Search
CPC .... B41J 2/165; B41J 2/16502; B41J 2/16505; B41J 2/16517; B41J 2/16552; B41J 2002/16558
See application file for complete search history.

(56) References Cited

U.S. PATENT DOCUMENTS

| | | | | |
|---|---|---|---|---|
| 2001/0043250 | A1 | 11/2001 | Faisst et al. | |
| 2013/0076830 | A1* | 3/2013 | Inoue .................. | B41J 2/16535 347/33 |
| 2018/0178526 | A1* | 6/2018 | Lela ..................... | B41J 2/16585 |
| 2019/0160821 | A1 | 5/2019 | Gencan et al. | |

FOREIGN PATENT DOCUMENTS

| | | | | |
|---|---|---|---|---|
| JP | H10-119295 | A | | 5/1998 |
| JP | 2013139088 | A | * | 7/2013 |
| JP | 2015-217593 | A | | 12/2015 |
| JP | 2015-231729 | A | | 12/2015 |

OTHER PUBLICATIONS

Okayama, Machine TranslationofJP-2013139088-A, 2013 (Year: 2013).*
Extended European Search Report dated Feb. 22, 2024 of European Patent Application No. 23194253.3.

* cited by examiner

*Primary Examiner* — Scott A Richmond
(74) *Attorney, Agent, or Firm* — Rimon P.C.

(57) ABSTRACT

A technique allows satisfactorily cleaning ejection heads with a cleaning liquid while protecting ink meniscus in nozzles. A printer includes an ejection head, a cleaning-liquid block, and a receptacle. The ejection head has an ink ejecting plane that includes nozzles as openings and ejects ink from the nozzles. The cleaning block has a head opposing plane that includes an ejection hole as an opening. The cleaning block ejects a cleaning liquid in an inclination direction inclined relative to the ink ejecting plane. The receptacle is located below the cleaning block and receives the cleaning liquid ejected from the ejection hole.

9 Claims, 9 Drawing Sheets

PRINTER

RELATED APPLICATIONS

This application claims priority from Japanese Application No. 2022-151017, filed on Sep. 22, 2022. The disclosure of which is incorporated by reference herein.

BACKGROUND OF THE INVENTION

Field of the Invention

The subject matter disclosed in the specification of the present invention relates to a printer.

Description of the Background Art

Conventionally, printers use ejection heads that eject ink by using an inkjet method. Such printers are known to suffer from the occurrence of ejection failures such as improper ink ejection from nozzles due to solidification of the ink adhering to the ejection heads. Japanese Patent Application Laid-Opens Nos. 2015-231729, 2015-217593, and H10-119295 describe doing cleaning as appropriate in which the ink is removed from the ejection heeds by, for example, a cap or a wiper.

SUMMARY OF THE INVENTION

Technical Problem

In the case where a cleaning liquid is supplied to the ejection heads in order to remove the ink from the ejection heads as described above, ink meniscus in the nozzles may collapse due to an inflow of the cleaning liquid into the nozzles. Thus, there is demand for a technique for effectively cleaning the ejection heads with the cleaning liquid while protecting the meniscus in the nozzles.

It is an object of the present invention to provide a technique for satisfactorily cleaning an ejection head with a cleaning liquid while protecting ink meniscus in nozzles.

Solution to Problem

To solve the problem described above, a first aspect of the present invention is a printer that includes at least one ejection head that has a nozzle surface including a nozzle as an opening and that ejects ink from the nozzle, a cleaning-liquid ejector that has a head opposing plane including an ejection hole as an opening and that ejects a cleaning liquid from the ejection hole in an inclination direction inclined relative to the nozzle surface, and a receptacle that is located below the cleaning-liquid ejector and that receives the cleaning liquid ejected from the ejection hole.

According to the printer of the first aspect, the cleaning liquid is ejected diagonally relative to the nozzle surface of the ejection head and thereby forms a flow of the cleaning liquid along the nozzle surface. Thus, the nozzle surface can be cleaned satisfactorily. Besides, the inflow of the cleaning liquid into the nozzle can be reduced by decreasing the velocity of ejection of the cleaning liquid in a direction perpendicular to the nozzle surface. Accordingly, it is possible to properly protect ink meniscus in the nozzle.

A second aspect of the present invention is the printer according to the first aspect that further includes a motion driver that moves the cleaning-liquid ejector to one side in a first direction relative to the ejection head in a state in which the head opposing plane of the cleaning-liquid ejector faces the nozzle surface of the ejection head.

According to the printer of the second aspect, the nozzle surface of the ejection head can be cleaned by moving the cleaning-liquid ejector, which ejects the cleaning liquid, relative to the ejection head.

A third aspect of the present invention is the printer according to the second aspect, in which the at least one ejection head includes a plurality of ejection heads arranged in the first direction.

According to the printer of the third aspect, the amount of inflow of the cleaning liquid into interstices between the ejection heads can be reduced because the cleaning-liquid ejector ejects the cleaning liquid in a direction inclined relative to the nozzle surface.

A fourth aspect of the present invention is the printer according to the second or third aspect, in which the inclination direction is a direction inclined in the first direction from the head opposing plane toward the nozzle surface.

According to the printer of the fourth aspect, the cleaning liquid ejected from the ejection hole is allowed to flow in the first direction.

A fifth aspect of the present invention is the printer according to the fourth aspect, in which the inclination direction is a direction inclined to one side in the first direction from the head opposing plane toward the nozzle surface.

According to the printer of the fifth aspect, the effect of cleaning can be improved because it is possible to increase the speed of ejection of the cleaning liquid in the first direction relative to the ejection head.

A sixth aspect of the present invention is the printer according to any one of the first to fifth aspects that further includes a suction part that sucks a liquid through a suction hole. The suction hole is open in the head opposing plane.

According to the printer of the sixth aspect, it is possible to suck the cleaning liquid ejected from the cleaning-liquid ejector.

A seventh aspect of the present invention is the printer according to the sixth aspect, in which the inclination direction is a direction inclined from the head opposing plane to the nozzle surface in a direction from the ejection hole to the suction hole.

According to the printer of the seventh aspect, a flow of the cleaning liquid can be formed from the ejection hole to the suction hole. This allows satisfactory collection of the cleaning liquid used to clean the nozzle surface of the ejection head.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention will be described with reference to the accompanying drawings. Note that constituent elements described in the embodiment are merely examples, and the scope of the present invention is not intended to be limited thereto. To facilitate understanding of the drawings, the dimensions or number of each constituent element may be illustrated in an exaggerated or simplified manner as necessary.

1. Embodiment

Figure 1:
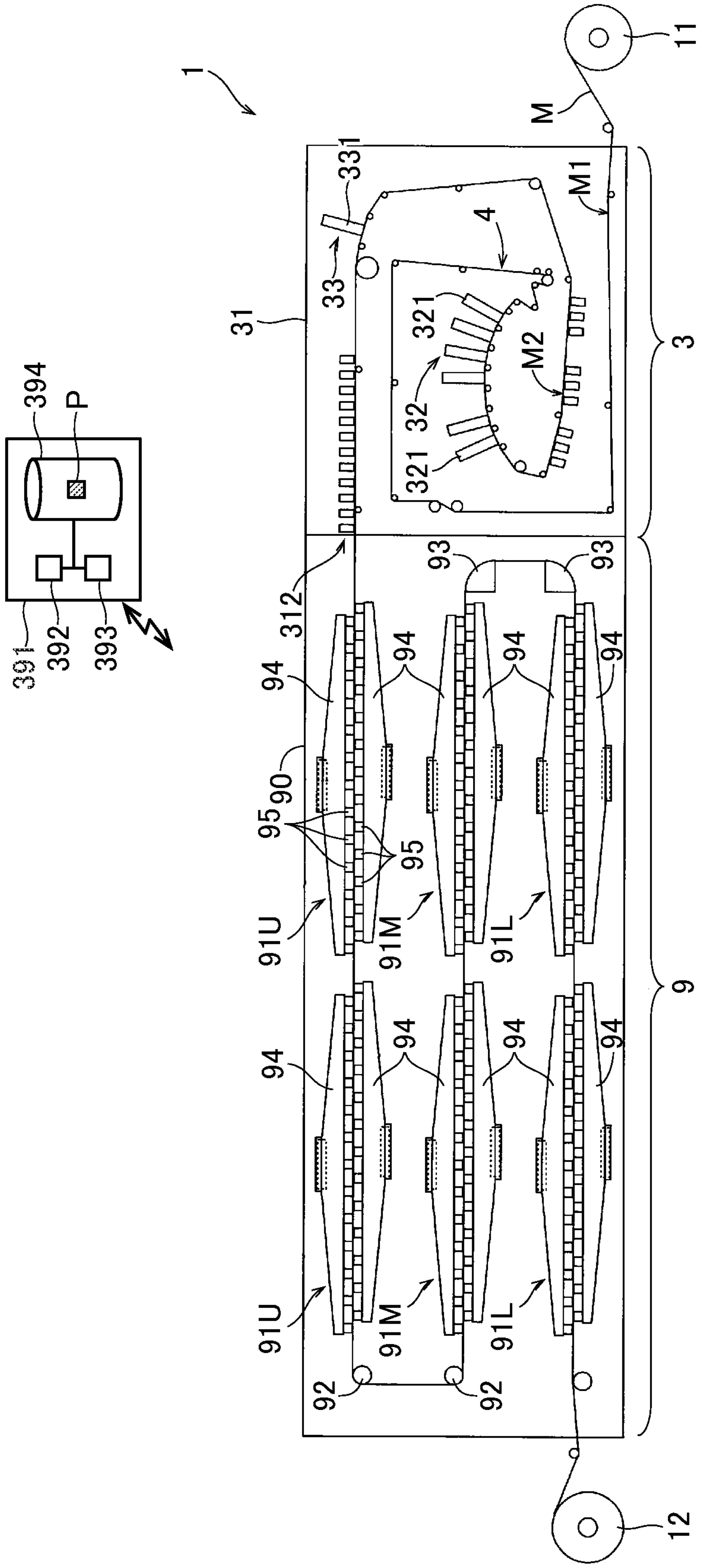
FIG. 1 is a front view schematically showing one example of a printing system that includes a printer according to the present invention.

FIG. 1 is a front view schematically showing one example of a printing system that includes a printer according to the present invention. FIG. 1 and subsequent drawings appropriately show arrows indicating a horizontal direction X and a vertical direction Z. As shown in FIG. 1, the printing system 1 includes a printer 3 and a drier 9 that are arranged in the horizontal direction X. This printing system 1 transports a long band-like printing medium M in a roll-to-roll process from a feed roll 11 to a take-up roll 12. The printing medium M may, for example, be a film such as oriented polypropylene (OPP) or polyethylene terephthalate (PET). However, the printing medium M is not limited to the film and may be paper or metal foil. The printing medium M has flexibility. In the following description, one of both sides of the printing medium M on which an image is to be printed is referred to as a front surface M1, and the other side of the front surface M1 is referred to as a rear surface M2.

The drier 9 includes a drying furnace 90 and dries the printing medium M transported from the printer 3 by transport from the feed roll 11 to the take-up roll 12. The drying furnace 90 includes therein two upper blast units 91U arranged in the horizontal direction X, two middle blast units 91M arranged in the horizontal direction X under the upper blast units 91U, and two lower blast units 91L arranged in the horizontal direction X under the middle blast units 91M.

The printing medium M transported out from an export outlet 312 of the printer 3 passes in the horizontal direction X through the two upper blast units 91U and is then folded back to the two middle blast units 91M by a pair of rollers 92. Then, the printing medium M passes in the horizontal direction X through the two middle blast units 91M and is then folded back to the two lower blast units 91L by a pair of air turn bars 93. The printing medium M further passes in the horizontal direction X through the two lower blast units 91L and is then transported out of the drier 9.

Each upper blast unit 91U includes two blast chambers 94 arranged so as to sandwich the printing medium M passing in the horizontal direction X from both sides in the vertical direction Z. Each blast chamber 94 includes a plurality of nozzles 95 arranged in the horizontal direction X and jets warm air (gas with a temperature of 60 degrees centigrade or higher) from each nozzle 95 to the printing medium M. In this way, the printing medium M is dried with the warm air jetted from the nozzles 95 of the blast chambers 94 while passing between the two upper and lower blast chambers 94. Like the upper blast units 91U, each of the middle blast units 91M and the lower blast units 91L also includes two blast chambers 94 that sandwich the printing medium M from both sides in the vertical direction Z.

By the way, a specific configuration of the upper blast units 91U is not limited to the above example. For example, out of the upper and lower blast chambers 94 of each upper blast unit 91U, the lower blast chamber 94 may be replaced by a plurality of rollers arranged in the horizontal direction X. In this configuration, the rear surface M2 of the printing medium M is supported from the underside by the rollers, and warm air is jetted from the upper blast chamber 94 to the front surface M1 of the printing medium M.

Figure 2:
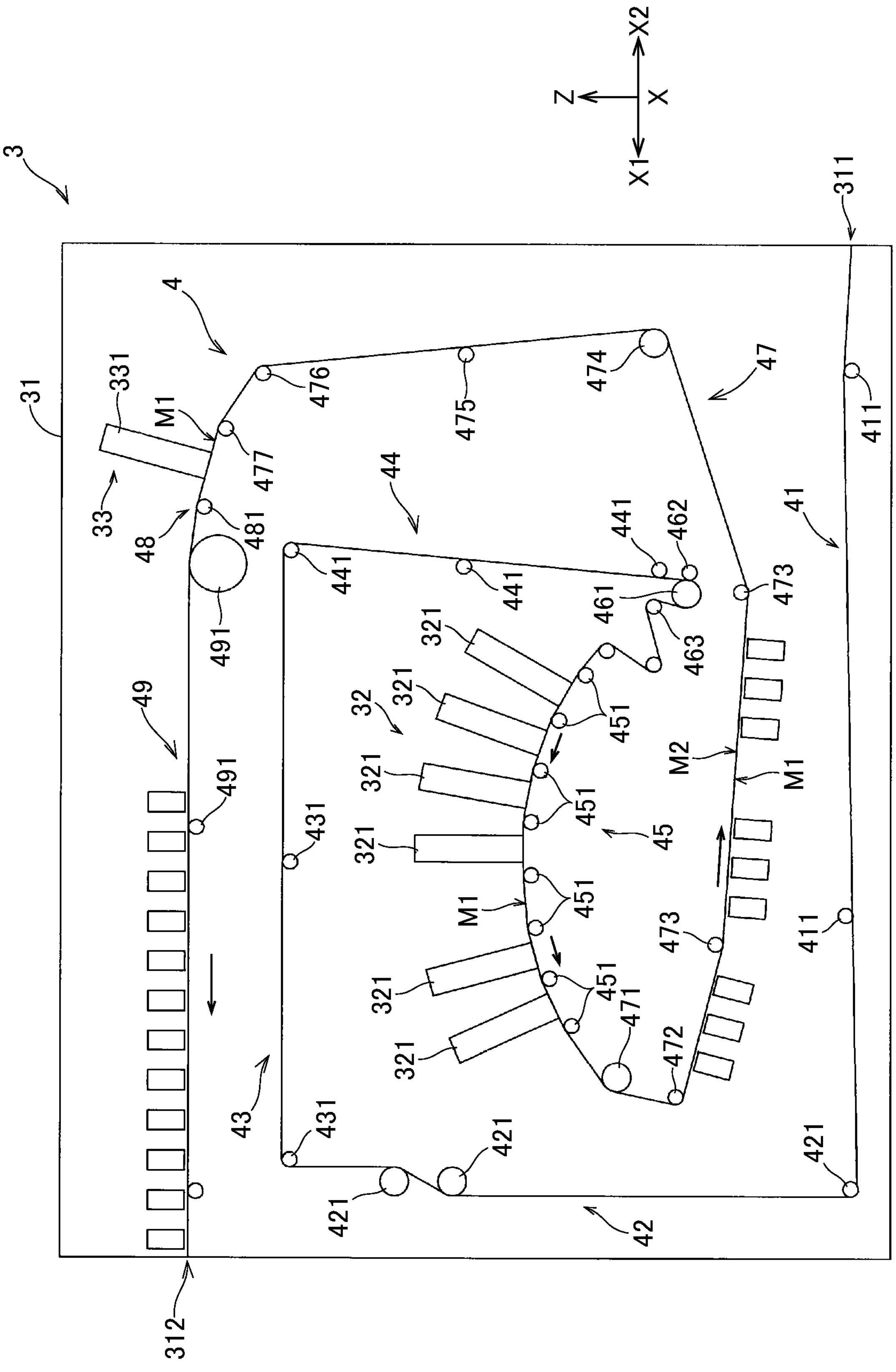
FIG. 2 is a front view schematically showing the printer included in the printing system in FIG. 1.

FIG. 2 is a front view schematically showing the printer in the printing system shown in FIG. 1. FIG. 2 shows arrows indicating one side X1 and the other side X2 in the horizontal direction X. The one side X1 is the side of the printer 3 toward the drier 9, and the other side X2 is the opposite side to the one side X1. The printer 3 includes a casing 31, a color printer 32 arranged in the casing 31, a white printer 33 arranged above the color printer 32 in the casing 31, and a transporter 4 that transports the printing medium M by a plurality of rollers arranged in the casing 31.

The color printer 32 includes a plurality of (six) head units 321 aligned in a travel direction of the printing medium M (the direction from the other side X2 to the one side X1) above the printing medium M transported by the transporter 4. Each of the head units 321 has a nozzle that faces, from above, the front surface M1 of the printing medium M passing under the nozzle and ejects color ink of a different color from the nozzle by an inkjet method. The color ink as used herein refers to ink of any color other than white and includes, for example, cyan ink, magenta ink, yellow ink, and black ink. In this way, the head units 321 of the color printer 32 eject color ink from above to the front surface M1 of the printing medium M passing thereunder so as to print a color image on the front surface M1 of the printing medium M.

The white printer 33 includes one head unit 331 arranged above the printing medium M transported by the transporter 4. The head unit 331 includes a nozzle that faces, from above, the front surface M1 of the printing medium M passing under the nozzle and ejects white ink from the nozzle by an inkjet method. In this way, the head unit 331 of the white printer 33 ejects the white ink from above to the front surface M1 of the printing medium M passing thereunder so as to print a white image on the front surface M1 of the printing medium M.

The casing 31 has an open import outlet 311 in the side wall on the other side X2 and an open export outlet 312 in the side wall on the one side X1. The transporter 4 transports the printing medium M from the import outlet 311 to the export outlet 312 by a route passing through the color printer 32 and the white printer 33 described above.

The transporter 4 includes an import part 41 provided under the color printer 32, a hoisting transporter 42 provided on the one side X1 of the color printer 32, an upper transporter 43 provided above the color printer 32, and a lowering transporter 44 provided on the other side X2 of the color printer 32. The import part 41 transports the printing medium M transported into the casing from the import outlet 311, to the one side X1 by rollers 411, the hoisting transporter 42 transports the printing medium M transported from the import part 41 to the upper side by rollers 421, the upper transporter 43 transports the printing medium M transported from the hoisting transporter 42 to the other side X2 by rollers 431, and the lowering transporter 44 transports the printing medium M transported from the upper transporter 43 to the lower side by rollers 441.

The transporter 4 further includes a color transporter 45 that supports, from the underside, the printing medium M that faces the color printer 32. The printing medium M that has passed through the lowering transporter 44 is transported into the color transporter 45. The color transporter 45 includes a plurality of rollers 451 arranged from the other side X2 to the one side X1, and each roller 451 comes in contact with the rear surface M2 of the printing medium M from the underside. In this way, the front surface M1 of the printing medium M supported by the color transporter 45 faces upward, and each head unit 321 of the color printer 32 faces the front surface M1 from above and ejects color ink.

The transporter 4 further includes rollers 461, 462, and 463 arranged between the color transporter 45 and the lowering transporter 44 in the travel direction of the printing medium M. The roller 461 is a drive roller that drives the printing medium M. The rollers 462 and 463 are idler rollers that rotate following the printing medium M.

The transporter 4 further includes an inverting transporter 47 that inverts the printing medium M transported from the color transporter 45 to the one side X1 twice upside down. The inverting transporter 47 includes a plurality of rollers 471 to 477 that include a drive roller 471 and inverts the printing medium M twice upside down, with the rollers 471 to 477 coming in contact with the rear surface M2 of the printing medium M. That is, the inverting transporter 47 transports the printing medium M transported from the color transporter 45 in a downward direction by the rollers 471 and 472, changes the travel direction of the printing medium M to the other side X2 by the roller 472, and transports the printing medium M to the other side X2 so as to invert the front surface M1 and the rear surface M2 of the printing medium M upside down. Then, the inverting transporter 47 transports the printing medium M from the one side X1 to the other side X2 by the rollers 473 and then transports the printing medium M in an upward direction by the rollers 474 to 476. The inverting transporter 47 further changes the travel direction of the printing medium M to the one side X1 by the roller 477 so as to again invert the front surface M1 and rear surface M2 of the printing medium M upside down by the roller 476, and transports the printing medium M from the other side X2 to the one side X1 by the roller 477.

The transporter 4 further includes a white transporter 48 that supports, from the underside, the printing medium M facing the white printer 33. The printing medium M inverted twice upside down by the inverting transporter 47 enters the white transporter 48. The white transporter 48 includes a roller 481 that comes in contact with the rear surface M2 of the printing medium M from the underside. Thus, the front surface M1 of the printing medium M supported by the white transporter 48 faces upward, and the head unit 331 of the white printer 33 that faces the front surface M1 from above ejects the white ink to the front surface M1.

The transporter 4 further includes an exporter 49 provided above the upper transporter 43. The exporter 49 includes a plurality of rollers 491 aligned from the other side X2 to the one side X1 in the horizontal direction X. The exporter 49 transports the printing medium M transported from the white transporter 48 to the one side X1 by the plurality of rollers 491 so as to transport the printing medium M to the drier 9 through the export outlet 312 of the casing 31.

As described above, the color printer 32 of the printer 3 includes the head units 321, and the white printer 33 thereof includes include the head unit 331. These head units 321 and 331 will now be described below. Note that each of the head units 321 and 331 has a common basic configuration. Thus, the following description is given about one of the head units 321, and descriptions about the other head units 321 and 331 are omitted. Ejection heads H of the head unit 321 are slightly inclined in accordance with the position of the printing medium M. However, the inclination of the ejection head H is merely slight and thus not shown in subsequent drawings.

Figure 3:
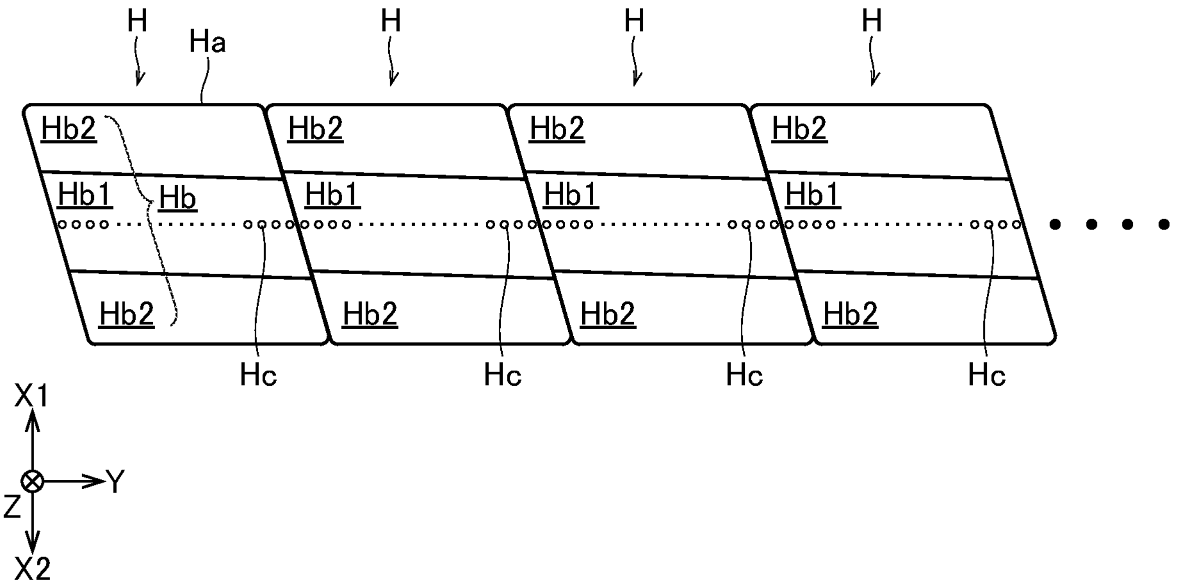
FIG. 3 is a bottom view schematically showing the bottom surface of one head unit.
Figure 4:
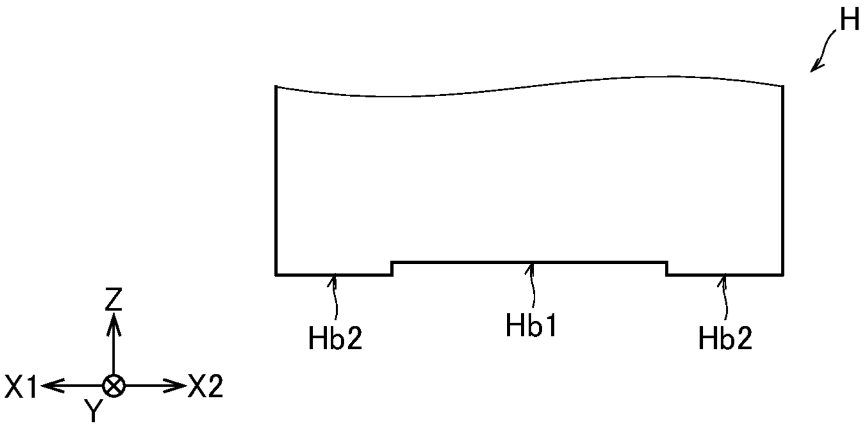
FIG. 4 is a side view schematically showing the side surface of the head unit.

FIG. 3 is a bottom view schematically showing the bottom surface of the head unit. FIG. 4 is a side view schematically showing the side surface of the head unit. FIGS. 3 and 4 show, aside from the arrows indicating the horizontal direction X (one side X1 and the other side X2) and the vertical direction Z, an arrow indicating the horizontal direction Y orthogonal to the horizontal direction X. As shown in FIG. 3, the head unit 321 includes a plurality of ejection heads H aligned in line in the horizontal direction Y to eject ink of the same color. Note that the form of arrangement of the ejection heads H is not limited to the example in FIG. 3, and the ejection heads H may be arranged in a staggered manner.

Each ejection head H includes a housing Ha. The housing Ha has a parallelogram bottom surface Hb. As shown in FIG. 3, the bottom surface Hb includes two straight lines that extend in the horizontal direction Y and two oblique sides that are inclined relative to the horizontal direction X. Two ejection heads H adjacent to each other in the horizontal direction Y are arranged such that the oblique sides of their bottom surfaces Hb overlap each other. Note that the shape of the bottom surface Hb is not limited to the parallelogram, and may be any other shape such as a square or a rectangle.

The bottom surface Hb of the housing Ha includes an ink ejecting plane Hb1 and two raised planes Hb2. The ink ejecting plane Hb1 is sandwiched between the two raised planes Hb2 in the horizontal direction X. The ink ejecting plane Hb1 and the raised plane Hb2 are parallel to one another. The ink ejecting plane Hb1 and the raised plane Hb2 face the front surface M1 of the printing medium M. As shown in FIG. 4, the two raised planes Hb2 arranged in the horizontal direction X are located at the same height. In other words, the two raised planes Hb2 are flush with each other. The ink ejecting plane Hb1 is located above the two raised planes Hb2. That is, the two raised planes Hb2 protrudes below the ink ejecting plane Hb1 located between the two raised planes Hb2. Each raised plane Hb2 may be formed of, for example, glass fiber.

The ink ejecting plane Hb1 includes a plurality of open nozzles Hc arranged at intervals in the horizontal direction Y. In the example shown in FIG. 3, the nozzles Hc are arranged in line. Note that the form of arrangement of the nozzles Hc is not limited to this example. For example, the nozzles Hc may be arranged in a staggered manner in the horizontal direction Y. Each nozzle Hc ejects droplets of ink (hereinafter, referred to as "ink droplets") toward the front surface M1 of the printing medium M. Note that the ejection of ink droplets is implemented by any of various inkjet techniques such as a piezo-inkjet method or a thermal-inkjet method.

Figure 5:
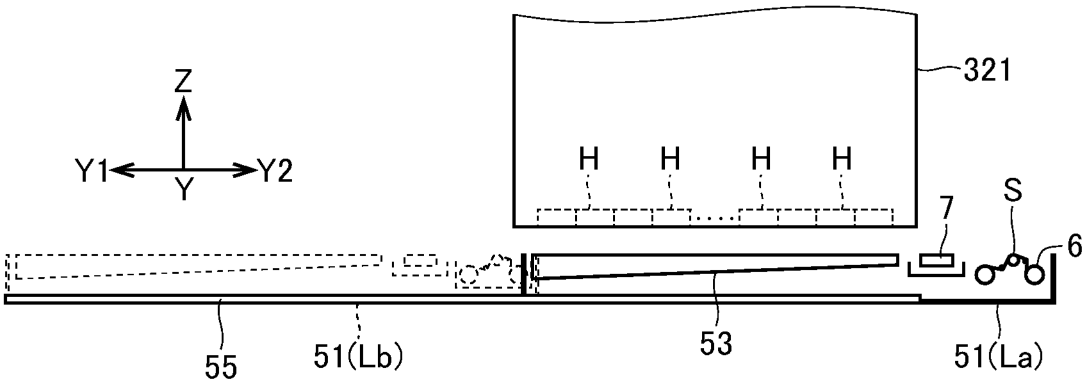
FIG. 5 is a diagram showing a maintenance unit according to the embodiment.
Figure 6:
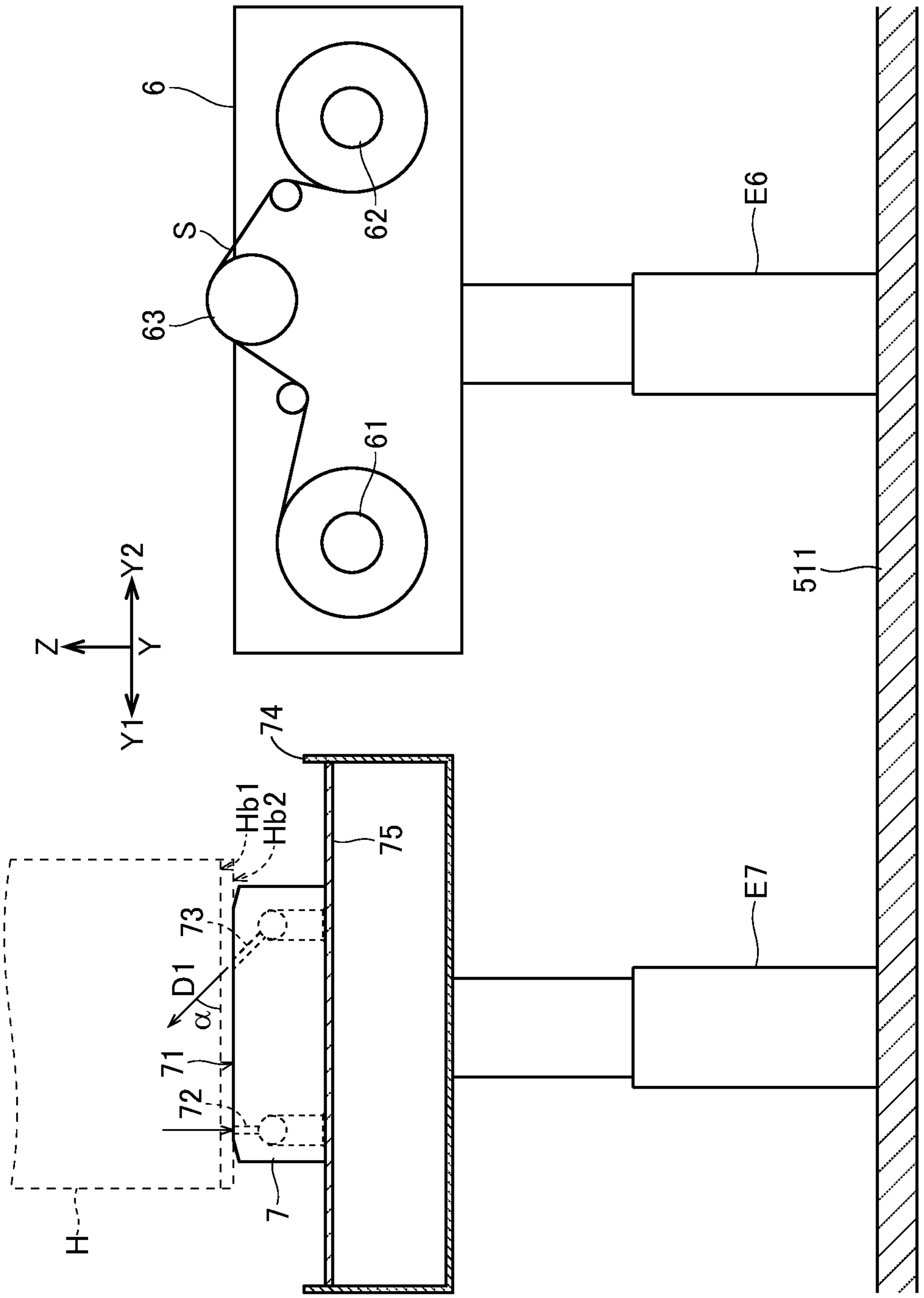
FIG. 6 is a diagram schematically showing a wiping unit and a cleaning block of the maintenance unit.

FIG. 5 is a diagram showing a maintenance unit according to the embodiment. FIG. 6 is a diagram schematically showing a wiping unit and a cleaning block included in the maintenance unit. FIGS. 5 and 6 show arrows indicating one side Y1 and the other side Y2 in the horizontal direction Y. The one side Y1 is the side from the wiping unit 6 toward the cleaning block 7. The other side Y2 is the opposite side to the one side Y1. In FIG. 6, one of the ejection heads H that faces the cleaning block 7 in the vertical direction Z in an ink removal step S104 (FIG. 10) described later is indicated by the broken line.

As shown in FIG. 5, the printer 3 includes a maintenance unit 51 for performing maintenance of each ejection head H. The maintenance unit 51 is provided for each of the head units 321 and 331, and the maintenance units 51 provided for the head units 321 and 331 have a common configuration and perform common operations. Thus, one of the maintenance units 51 will now be described. The maintenance unit 51 is slightly inclined in accordance with the position of the head unit 321 or 331 to be cleaned. However, the inclination of the maintenance unit 51 is merely slight and thus not shown in subsequent drawings.

Figure 10:
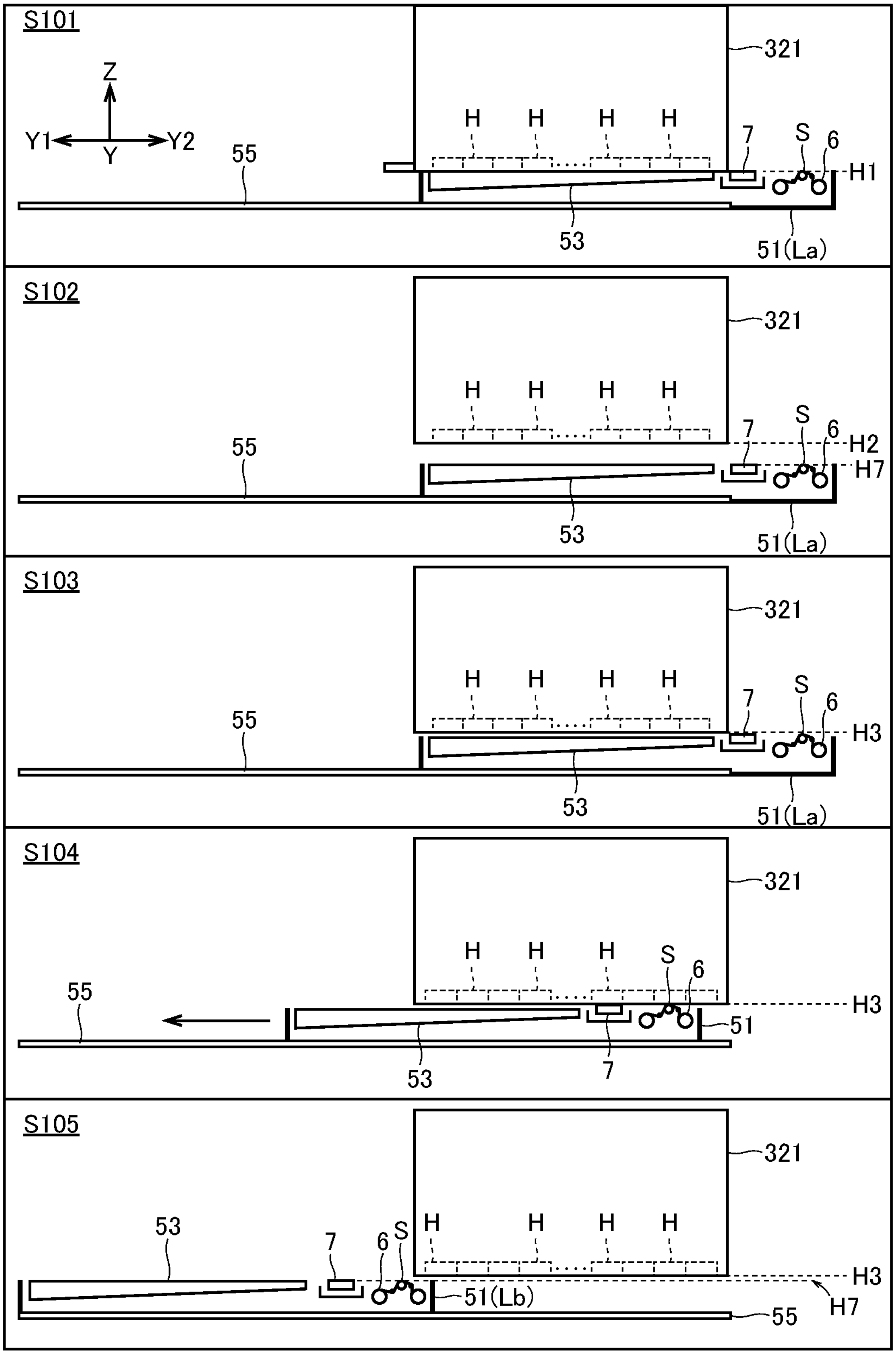
FIG. 10 is a diagram schematically showing one example of maintenance processing that is performed by the maintenance unit.

As shown in FIG. 5, the printer 3 includes a direct-acting mechanism 55 that drives the maintenance unit 51 in the horizontal direction Y. The direct-acting mechanism 55 may be configured by, for example, a ball screw or a linear motor. The direct-acting mechanism 55 moves the maintenance unit 51 between an opposing position La and a retracted position Lb located at an interval from the opposing location La in the horizontal direction Y. In the case where the maintenance unit 51 is located at the opposing position La, a cap 53 described later faces the ejection heads H. In the case where the maintenance unit 51 is located at the retracted position Lb, the cap 53 does not face the ejection heads H. In order to avoid interference with the maintenance unit 51, the ejection heads H integrally move up and down. For example, the raised planes Hb2, i.e., the lower end faces of the ejection heads H, are arranged as appropriate at one of a print height, a cap height H1, a retracted height H2, and a cleaning height H3 (FIG. 10). The cap height H1 is higher than the print height. The retracted height H2 is higher than the cap height H1. The cleaning height H3 is higher than the cap height H1 and lower than the retracted height H2.

As shown in FIG. 5, the maintenance unit 51 includes the cap 53, a wiping unit 6, and a cleaning block 7 (cleaning-liquid ejector). The cap 53 performs capping of covering the ejection heads H from the underside. As shown in FIG. 6, the wiping unit 6 includes a feed roller 61 and a take-up roller 62. The feed roller 61 and the take-up roller 62 are located at an interval in the horizontal direction Y. The wiping unit 6 transports a sheet S in a roll-to-roll process from the feed roller 61 to the take-up roller 62. The wiping unit 6 includes a wiping roller 63 that winds the sheet S from the underside. The wiping roller 63 is located between the feed roller 61 and the take-up roller 62 in the horizontal direction Y. The wiping unit 6 wipes the ink adhering to the raised planes Hb2 with the sheet S by transporting the sheet S while sandwiching the sheet S between the wiping roller 63 and the raised planes Hb2 of the ejection head H (head wipe cleaning). The sheet S may be a long band-like cloth. However, the material for the sheet S is not limited to the cloth and may, for example, be paper.

As shown in FIG. 6, the maintenance unit 51 includes a hoisting and lowering actuator E6 that moves the wiping unit 6 up and down relative to the housing 511 of the maintenance unit 51. In the case where the wiping unit 6 performs head wipe cleaning, the hoisting and lowering actuator E6 moves the wiping unit 6 up to a wiping position. In the case where the wiping unit 6 does not perform wipe cleaning, the hoisting and lowering actuator E6 moves the wiping unit 6 down to a position below the wiping position.

The cleaning block 7 is located between the cap 53 and the wiping unit 6 in the horizontal direction Y. The cleaning block 7 has an upper surface that includes a head opposing plane 71. The head opposing plane 71 is a plane parallel to the raised planes Hb2 of the ejection heads H. The cleaning block 7 includes suction holes 72 and ejection holes 73 that are open in the head opposing plane 71. The suction holes 72 serve to suck the ink or the cleaning liquid from the head opposing plane 71, using a negative pressure applied by a cleaning unit 8 described later (FIG. 8) (pressure lower than atmospheric pressure). The ejection holes 73 serve to eject the cleaning liquid supplied from the cleaning unit 8.

The cleaning block 7 ejects the cleaning liquid in an inclination direction D1 inclined relative to the ink ejecting planes Hb1 from the ejection holes 73. In the present embodiment, the ejection holes 73 extend in the inclination direction D1 as shown in FIG. 6. The inclination direction D1 is a direction inclined at an angle α that is greater than 0° and less than 90° relative to the ink ejecting planes Hb1 of the ejection heads H. That is, the inclination direction D1 is a direction that intersects with the ink ejecting planes Hb1 and that is not perpendicular to the ink ejection planes Hb1. In the present embodiment, the inclination direction D1 is a direction inclined at the angle α relative to both the raised planes Hb2 and the head opposing planes 71.

As shown in FIG. 6, the printer 3 includes a receptacle 74. The receptacle 74 is located below the cleaning block 7. The receptacle 74 is a closed-end tubular container that has an open top. In a plan view viewed from above in the vertical direction, the upper opening of the receptacle 74 is larger than the cleaning block 7. The cleaning block 7 is located inward of the upper opening of the receptacle 74. The receptacle 74 receives the cleaning liquid ejected from each ejection hole 73 of the cleaning block 7.

As shown in FIG. 6, the receptacle 74 includes therein a plurality of plate springs 75 (elastic members) that extend in the horizontal direction Y. The plate springs 75 are located inside the receptacle 74. The cleaning block 7 is supported by the plate springs 75.

The maintenance unit 51 includes a hoisting and lowering actuator E7 that moves the cleaning block 7 up and down relative to the housing 511 of the maintenance unit 51. In the case where the cleaning block 7 performs head maintenance described later, the hoisting and lowering actuator E7 moves the cleaning block 7 up to the cleaning height H3 (FIG. 10). In the case where the cleaning block 7 does not perform head maintenance, the hoisting and lowering actuator E7 moves the cleaning block 7 down to a standby height H7 (FIG. 10) that is below the cleaning height H3.

In the case where the cleaning block 7 is located at the cleaning height H3, the head opposing plane 71 of the cleaning block 7 abuts on the bottom surfaces Hb (to be more specific, the raised planes Hb2) of the ejection heads H as shown in FIG. 6. At this time, the plate springs 75 become elastically deformed so as to bring the cleaning block 7 in abutment with the cleaning block 7 under appropriate pressure.

Figure 7:
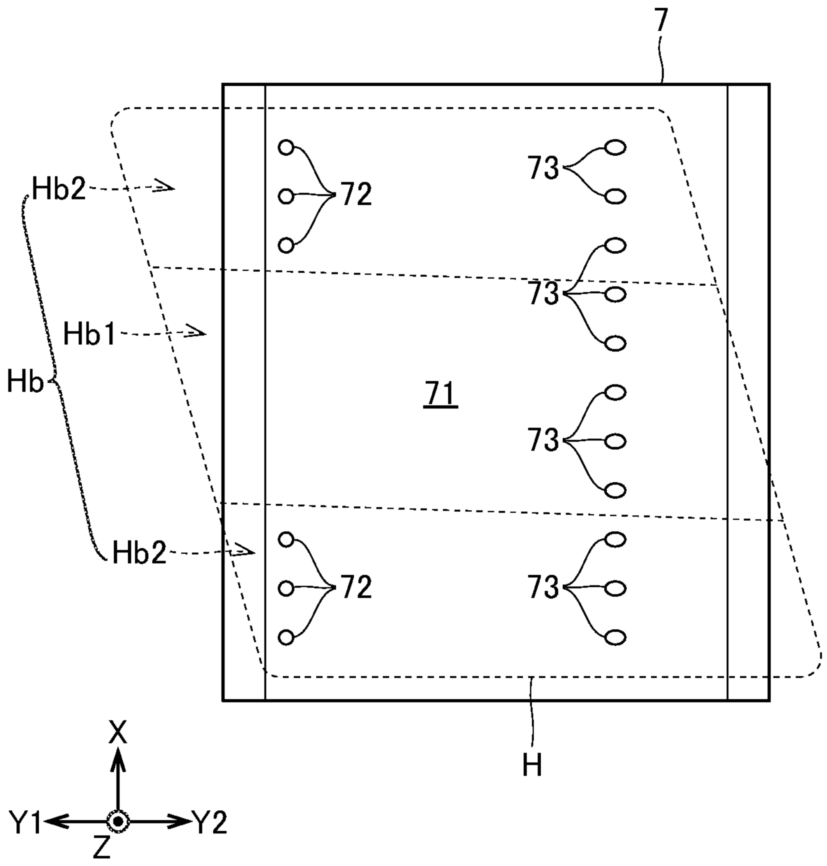
FIG. 7 is a top view schematically showing the cleaning block.
Figure 8:
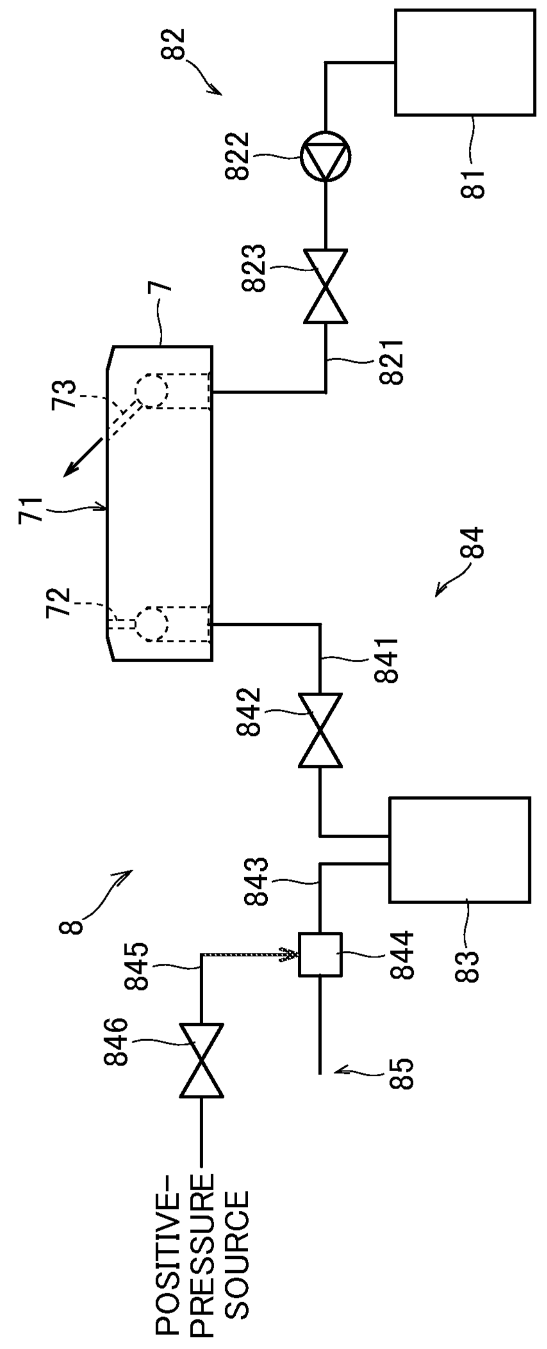
FIG. 8 is a diagram schematically showing a configuration of a cleaning unit 8 that supplies a cleaning liquid or a negative pressure required in a cleaning operation performed by the cleaning block.

FIG. 7 is a top view chemically showing the cleaning block. FIG. 8 is a diagram schematically showing a configuration of the cleaning unit 8 that supplies the negative pressure or the cleaning liquid required for the cleaning block to perform the cleaning operation. In FIG. 7, one ejection head H that faces the cleaning block 7 in the vertical direction Z in the ink removal step S104 (FIG. 10) described later is indicated by the broken line.

As shown in FIG. 7, the head opposing plane 71 of the cleaning block 7 includes a plurality of suction holes 72 arranged in line in the horizontal direction X and a plurality of ejection holes 73 arranged in line in the horizontal direction X. The forms of arrangement of the suction holes 72 and the ejection holes 73 are, however, not limited to this example. For example, the suction holes 72 and the ejection holes 73 may be arranged alternately. As another alternative, the suction holes 72 and the ejection holes 73 each may be arranged in the horizontal direction Y.

The cleaning unit 8 supplies the negative pressure to the suction holes 72 and supplies the cleaning liquid to the ejection holes 73. The cleaning unit 8 includes a cleaning-liquid supplier 82. The cleaning-liquid supplier 82 includes a cleaning-liquid tank 81 that stores the cleaning liquid. For example, the cleaning liquid may be composed of components obtained by excluding color components (pigment or dyestuff) from the components of the ink. Note that the cleaning liquid may be a liquid containing a surfactant.

The cleaning liquid supplier 82 includes piping 821, a solution sending pump 822, and an on-off solenoid valve 823. The piping 821 connects the cleaning-liquid tank 81 and the ejection holes 73. The solution sending pump 822 and the on-off solenoid valve 823 are located in the piping 821. The on-off solenoid valve 823 is located between the solution sending pump 822 and the ejection holes 73. With the on-off solenoid valve 823 open, the solution sending pump 822 serves to supply the cleaning liquid from the cleaning-liquid tank 81 to the ejection holes 73 through the piping 821. When the solution sending pump 822 is stopped or the on-off solenoid valve 823 is closed, the supply of the cleaning liquid to the ejection holes 73 is stopped.

The cleaning unit 8 includes a negative-pressure applicator 84. The negative-pressure applicator 84 includes an aspirate trap tank 83, piping 841, an on-off solenoid valve 842, piping 843, an ejector 844, piping 845, and an on-off solenoid valve 846. The piping 841 connects the aspirate trap tank 83 and the suction holes 72. The on-off solenoid valve 842 is located in the piping 841 and opens or closes the piping 841. The piping 843 connects the aspirate trap tank 83 and the exhaust port 85. The ejector 844 is located in the piping 843. The piping 845 connects the ejector 844 and an positive-pressure source. The on-off solenoid valve 846 is located in the piping 845 and opens or closes the piping 845.

In the case where, with the on-off solenoid valve 846 open, the positive pressure is supplied from the positive-pressure source to the ejector 844, the ejector 844 generates a negative pressure in accordance with the supply of the positive pressure and exhausts gas (air) in the aspirate trap tank 83 to the exhaust port 85. This generates a negative pressure in the aspirate trap tank 83. Accordingly, with the on-off solenoid valve 842 open, the negative pressure in the aspirate trap tank 83 is supplied to the suction holes 72 through the piping 841.

The liquid (the ink or the cleaning liquid) sucked by the suction holes 72 under the negative pressure is trapped in the aspirate trap tank 83 through the piping 841. Meanwhile, when at least one of the on-off solenoid valve 842 and the on-off solenoid valve 846 is closed, the supply of the negative pressure to the suction holes 72 is stopped.

As shown in FIG. 1, the printer 3 includes a controller 391. The controller 391 is a computer and includes a processor 392 such as a CPU, a RAM 393, and an auxiliary storage 394 such as an HDD. The controller 391 controls the operations of each part connected thereto by the processor 392 executing a computer program P installed in the auxiliary storage 394.

Figure 9:
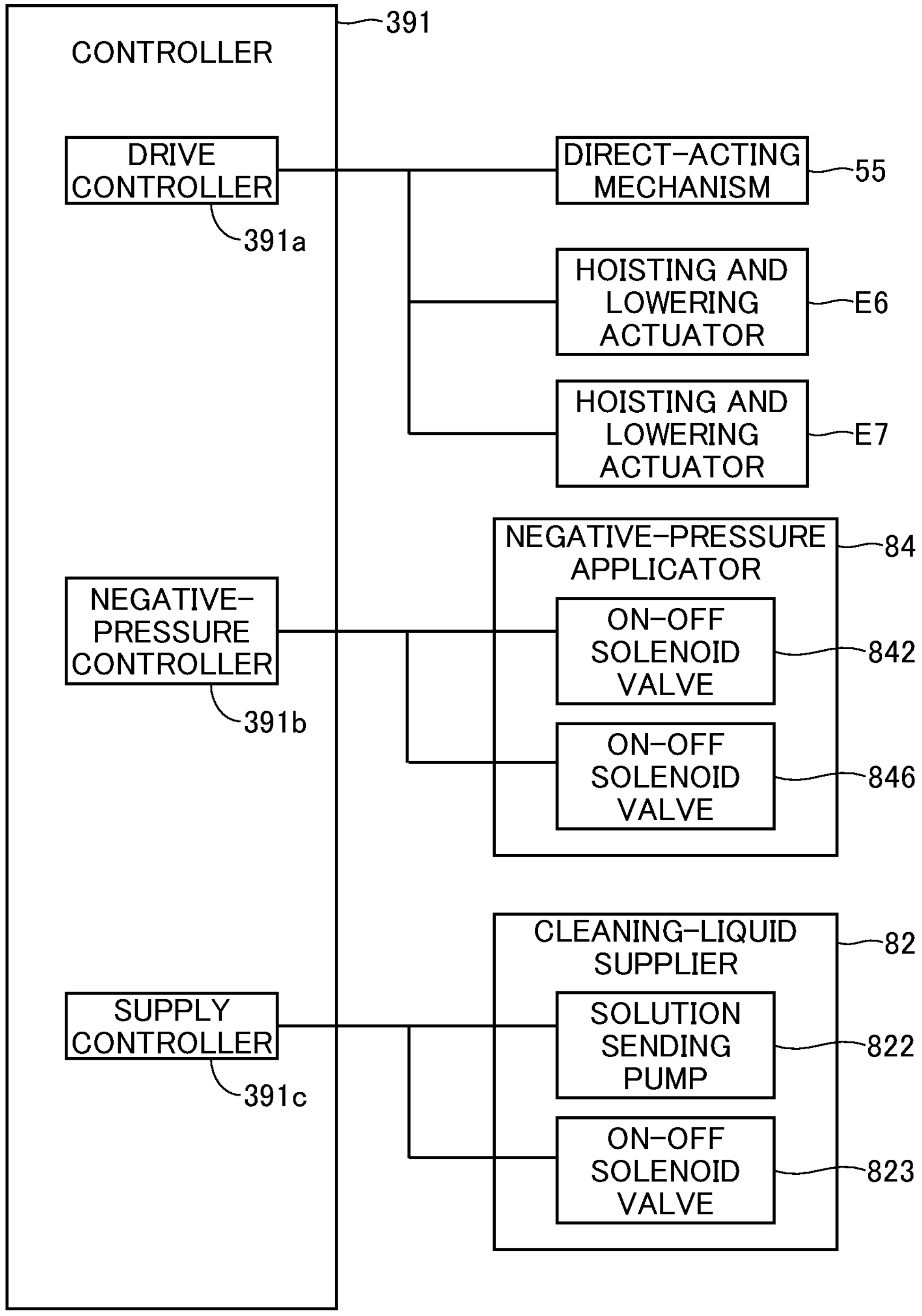
FIG. 9 is a block diagram showing an electrical configuration included in the printer to control the maintenance unit.

FIG. 9 is a block diagram showing an electrical configuration of the printer for controlling the maintenance unit. A drive controller 391*a*, a negative-pressure controller 391*b*, and a supply controller 391*c* shown in FIG. 9 are functions implemented in software by the processor 392 executing the computer program P.

The drive controller 391*a* controls the operations of the direct-acting mechanism 55 to move the maintenance unit 51 between the opposing position La and the retracted position Lb located at an interval from the opposing position La in the horizontal direction Y. The drive controller 391*a* also controls the operations of the hoisting and lowering actuator E6 to move the wiping unit 6 up and down relative to the housing 511 of the maintenance unit 51. The drive controller 391*a* further controls the operations of the hoisting and lowering actuator E7 to move the cleaning block 7 up and down relative to the housing 511 of the maintenance unit 51.

The negative-pressure controller 391*b* controls operations of switching an on-off solenoid valve 842 and an on-off solenoid valve 846 that configure the negative-pressure applicator 84 to start the application of negative pressure to the suction holes 72 of the cleaning block 7 or to stop the application of negative pressure to the suction holes 72.

The supply controller 391*c* controls a supply operation of the solution sending pump 822 and an operation of switching an on-off solenoid valve 823 to start the supply of the cleaning liquid to the ejection holes 73 of the cleaning block 7 or to stop the supply of the cleaning liquid to the ejection holes 73.

Maintenance Processing

FIG. 10 is a diagram schematically showing one example of the maintenance processing performed by the maintenance unit. The maintenance processing shown in FIG. 10, unless otherwise specified, is performed under the control of the controller 391. As shown in FIG. 10, the maintenance processing includes a purging process S101 and a cleaning process (S103 to S105).

The purging process S101 is the process of ejecting ink from each ejection head H in order to reduce the occurrence of ejection failures. As shown in FIG. 10, the maintenance unit 51 is located at the opposing position La in the purging process S101. The head unit 321 is located at the cap height H1. Thus, the cap 53 of the maintenance unit 51 abuts on the head unit 321 and covers the ejection heads H from the underside (capping). In the purging process S101, the wiping unit 6 and the cleaning block 7 are located away to the other side Y2 in the horizontal direction Y from the head unit 321.

In the purging process S101, ink droplets are ejected from all the nozzles Hc of each ejection head H for a predetermined period of time, with the cap 53 covering the underside of the ejection head H. The cap 53 includes a discharge mechanism (not shown) that sucks and discharges the ink. The ink droplets ejected into the cap 53 are discharged as appropriate by the discharge mechanism.

When the purging process S101 is completed, a capping release process S102 is performed. In the capping release process, the head unit 321 is moved up from the cap height H1 to the retracted height H2. Accordingly, the ejection heads H are separated from the cap 53. In the capping release process S102, the head opposing plane 71 of the cleaning block 7 and the upper end of the wiping unit 6 (to be more specific, the upper end of the roller 63) are located at the standby height H7. The standby height H7 may be flush with the cap height H1.

When the capping release process S102 is completed, the cleaning process is started. As shown in FIG. 10, the head cleaning process includes a positioning process S103, an ink removal step S104, and an end process S105. In the positioning process S103, the head unit 321 is moved down from the retracted height H2 to the cleaning height H3. The drive controller 391*a* controls the hoisting and lowering actuators E6 and E7 to move the head opposing plane 71 of the cleaning block 7 and the upper end of the wiping unit 6 up from the standby height H7 to the cleaning height H3.

In the ink removal step S104, the drive controller 391*a* controls the direct-acting mechanism 55 to move the maintenance unit 51 to the one side Y1 in the horizontal direction Y. In the ink removal step S104, the maintenance unit 51 is moved from the opposing position La to the retracted position Lb. This movement of the maintenance unit 51 causes the head opposing plane 71 of the cleaning block 7 to face the ink ejecting plane Hb1 of each ejection head H from the underside. The head opposing plane 71 is located at the same cleaning height H3 as the raised planes Hb2. Thus, the cleaning block 7 is moved to the one side Y1 in the horizontal direction Y, with both ends of the head opposing plane 71 in the horizontal direction X being in contact with the raised planes Hb2 and with the center of the head opposing plane 71 in the horizontal direction X facing the ink ejecting plane Hb1.

In this way, the direct-acting mechanism 55 moves the cleaning block 7 to the one side Y1 in the horizontal Y direction relative to the ejection head H, with the head opposing plane 71 of the cleaning block 7 facing the ink ejecting plane Hb1 of the ejection head H. The direct-acting mechanism 55 is one example of a "motion driver."

While the cleaning block 7 is moving to the one side Y1 in the ink removal step S104, the supply controller 391*c* controls the cleaning liquid supplier 82 to eject the cleaning liquid from the ejection holes 73. The cleaning liquid ejected from the ejection holes 73 is blown to the ink ejecting plane Hb1 and each raised plane Hb2. Accordingly, the ink droplets adhering to the ink ejecting plane Hb1 and each raised plane Hb2 are washed away as appropriate. Moreover, while the cleaning block 7 is moving to the one side Y1, the negative-pressure controller 391*b* controls the negative-pressure applicator 84 to apply the negative pressure to the suction holes 72. Accordingly, the cleaning liquid ejected from the ejection holes 73 are sucked via the suction holes 72. This forms a flow of the cleaning liquid from the ejection holes 73 toward the suction holes 72 between the cleaning block 7 and the ejection head H. The cleaning liquid that is not sucked by each suction hole 72 drops from the cleaning block 7 and is received by the receptacle 74.

As shown in FIG. 7, the width of the head opposing plane 71 of the cleaning block 7 in the horizontal direction X is greater than the width of the bottom surface Hb of each ejection head H. In the ink removal step S104, the bottom surface Hb of each ejection head H is located inward of the head opposing plane 71 of the cleaning block 7 in the X direction. In this way, with the head opposing plane 71 facing the bottom surface Hb, the cleaning block 7 is moved to the ejection head H in the horizontal direction Y. This allows the entire bottom surface Hb of each ejection head H to be cleaned satisfactorily.

In the ink removal step S104, when the maintenance unit 51 is moving to the one side Y1, the sheet S of the wiping unit 6 is in contact with each raised plane Hb2 of the ejection head H. In this state, the wiping unit 6 transports the sheet S in a roll-to-roll process while continuing to move to the one side Y1 in the horizontal direction Y. Accordingly, the cleaning liquid and the ink adhering to the raised planes Hb2 are wiped off by the sheet S. In the ink removal step S104, the sheet S of the wiping unit 6 may be brought into contact with the ink ejecting plane Hb1 of the ejection head H. In this case, it is possible to wipe the cleaning liquid remaining on the ink ejecting plane Hb1 of the ejection head H.

In the end process S105, the negative-pressure controller 391*b* controls the negative-pressure applicator 84 to stop the application of the negative pressure to the suction holes 72. The supply controller 391*c* also controls the cleaning liquid supplier 82 to stop the supply of the cleaning liquid to the ejection holes 73. Then, the drive controller 391*a* controls the hoisting and lowering actuators E6 and E7 to move the head opposing plane 71 of the cleaning block 7 and the upper end of the wiping unit 6 down from the cleaning height H3 to the standby height H7.

The above has been the procedure of the maintenance processing. Note that capping may be performed after the end process S105. That is, the drive controller 391*a* may control the direct-acting mechanism 55 to move the maintenance unit 51 to the opposing position La. Then, the head unit 321 may be moved down from the cleaning height H3 to the cap height H1 so that the bottom of each ejection head H is covered with the cap 53. This capping prevents drying of each nozzle of each ejection head H.

Advantageous Effects

The cleaning block 7 ejects the cleaning liquid in a direction inclined relative to the ink ejecting plane Hb1 (nozzle surface) from the ejection holes 73. This forms a flow of the cleaning liquid along the ink ejecting plane Hb1. Accordingly, it is possible to clean the ink ejecting plane Hb1 satisfactorily.

In the case where the cleaning liquid is ejected in the inclination direction D1, as compared with the case where the cleaning liquid is ejected in a direction perpendicular to the ink ejecting plane Hb1 (hereinafter, referred to as the "normal direction"), it is possible to reduce the velocity of ejection of the cleaning liquid in the normal direction. This prevents the inflow of the cleaning liquid into the nozzles Hc. Accordingly, it is possible to properly protect ink meniscus in the nozzles Hc.

Besides, the amount of cleaning liquid that enters interstices between the ejection heads H is reduced as a result of reducing the force in the normal direction. This prevents the cleaning liquid from being accumulated in the interstices between the ejection heads H.

As shown in FIG. 6, with the head opposing plane 71 facing the ink ejecting plane Hb1, the inclination direction D1 is inclined to the one side Y1 in the horizontal direction Y from the head opposing plane 71 toward the ink ejecting plane Hb1. In the ink removal step S104, the cleaning block 7 is moved to the one side Y1 in the horizontal direction Y relative to the ejection head H. That is, when the cleaning block 7 is viewed from above, in the ink removal step S104, the cleaning liquid is ejected in the opposite direction to the travel direction of the ejection heads H (the other side Y2 in the horizontal direction). This increase the velocity of ejection of the cleaning liquid relative to the ejection heads H and thereby improves the effect of cleaning the ejection heads H with the cleaning liquid. Moreover, a flow of the cleaning liquid toward the one side Y1 is formed because the suction holes 72 are located on the one side Y1 in the horizontal direction Y relative to the ejection holes 73. Therefore, it is possible to improve the effect of cleaning the ejection heads H with the cleaning liquid.

2. Variations

While the embodiment has been described thus far, the present invention is not intended to be limited to the embodiment as described above, and various modification are possible.

For example, it is not an absolute necessity to eject the cleaning liquid from all of the ejection holes 73 in the inclination direction D1. For example, ejection holes 73 that face the raised planes Hb2 in the ejection surface of the cleaning block 7 may serve to eject the cleaning liquid in a direction perpendicular to the raised planes Hb2.

The positions of the ejection holes 73 and the suction holes 72 in the head opposing plane 71 may be opposite. The inclination direction D1 of the ejection holes 73 may be inclined to the other side Y2.

The receptacle 74 may be omitted. For example, the housing 511 may function as a receptacle.

In the ink removal step S104, it is not an absolute necessity to bring the head opposing plane 71 of the cleaning block 7 into contact with the raised planes Hb2 of each ejection head H. For example, the head opposing plane 71 may be arranged away from the raised planes Hb2 by making the height of the head opposing plane 71 lower than the cleaning height H3. Note that the interval between the head opposing plane 71 and the raised planes Hb2 may preferably be a width that allows the space between the cleaning block 7 and the ejection head H to be filled with the cleaning liquid ejected from the ejection holes 73.

While the invention has been shown and described in detail, the foregoing description is in all aspects illustrative and not restrictive. It is therefore understood that numerous modifications and variations that are not described above can be devised without departing from the scope of the invention. The configurations in the embodiment and variations described above may be appropriately combined or omitted as long as there are no mutual inconsistencies.

What is claimed is:

1. A printer comprising:

at least one ejection head that has a bottom surface comprising:

an ink ejecting plane, which includes a nozzle as an opening and is configured to eject ink from the nozzle; and a raised plane that extends below the ink ejecting plane;

a cleaning-liquid ejector that has a head opposing plane including an ejection hole, the ejection hole ejecting cleaning liquid in a direction inclined relative to the ink ejecting plane, wherein the cleaning liquid cleans the bottom surface of the ejection head;

a suction part that sucks a liquid through a suction hole, wherein the suction hole is open in the head opposing plane; and a receptacle that is located below the cleaning-liquid ejector and that receives the cleaning liquid ejected from the ejection hole, wherein the head opposing plane of the cleaning-liquid ejector is located below and faces the ink ejecting plane when the cleaning liquid is ejected, and wherein the suction hole faces only the raised plane from below when the cleaning liquid is ejected.

2. The printer according to claim 1, further comprising a motion driver that moves the cleaning-liquid ejector to one side in a first direction relative to the ejection head in a state in which the head opposing plane of the cleaning-liquid ejector faces the ink ejecting plane of the ejection head.

3. The printer according to claim 2, wherein the at least one ejection head includes a plurality of ejection heads arranged in the first direction.

4. The printer according to claim 2, wherein the inclination direction is a direction inclined in the first direction from the head opposing plane toward the ink ejecting plane.

5. The printer according to claim 4, wherein the inclination direction is a direction inclined to one side in the first direction from the head opposing plane toward the ink ejecting plane.

6. The printer according to claim 1, wherein the inclination direction is a direction inclined from the head opposing plane to the ink ejecting plane in a direction from the ejection hole to the suction hole.

7. The printer according to claim 2 further comprising at least one plate spring that biases the head opposing plane of the cleaning-liquid ejector in abutment with the raised plane of the ejection head and brings the cleaning-liquid ejector into abutment with the ejection head, wherein the motion driver moves the ejection head and the cleaning-liquid ejector relative to each other in a horizontal direction, and wherein the motion driver moves the cleaning-liquid ejector and the ejection head relative to each other while the head opposing plane does not come into contact with the ink ejecting plane.

8. The printer according to claim 2, wherein the inclination direction is inclined to the one side in the first direction from the head opposing plane toward the nozzle surface, and the suction hole is located on the one side in the first direction relative to the ejection hole.

9. The printer according to claim 8, further comprising a wiping unit that wipes the ink adhering to the raised planes with a sheet, wherein the wiping unit is located on the other side in the first direction, which is the opposite side to the one side, relative to the cleaning-liquid ejector.

* * * * *